United States Patent [19]
Zahid

[11] 3,782,418
[45] Jan. 1, 1974

[54] PRESSURE PULSE DAMPENER DEVICE

[75] Inventor: Abduz Zahid, Monterey Park, Calif.

[73] Assignee: Greer Hydraulics, Inc., Los Angeles, Calif.

[22] Filed: Nov. 3, 1971

[21] Appl. No.: 195,243

[52] U.S. Cl............... 138/26, 138/30, 137/207
[51] Int. Cl............................... F16l 55/04
[58] Field of Search................ 138/26, 30, 31; 137/207

[56] References Cited
UNITED STATES PATENTS

| | | | |
|---|---|---|---|
| 3,169,551 | 2/1965 | Lewis | 138/26 |
| 2,269,624 | 1/1942 | Erickson | 138/26 |
| 3,593,746 | 7/1971 | Allewitz et al. | 138/30 |
| 2,763,280 | 9/1956 | Snyder | 137/207 |

*Primary Examiner*—Herbert F. Ross
*Attorney*—Arthur B. Colvin

[57] ABSTRACT

The invention relates to a pressure pulse dampener device comprising a pressure vessel having a movable partition therein defining two chambers, each having a port in communication therewith, one of the ports defining a gas port for charging of one of said chambers with gas under pressure and the other an oil port, said oil port having a hollow fitting rigidly secured at one end thereto, said fitting having an inlet port and an outlet port, the fitting having means therein defining a tortuous path for oil under pressure from said inlet port to said outlet port, the oil port being in communication with the tortuous path and means are provided in the fitting to afford a direct path from said inlet port to the outlet port for a portion of the oil under pressure entering the inlet port.

12 Claims, 5 Drawing Figures

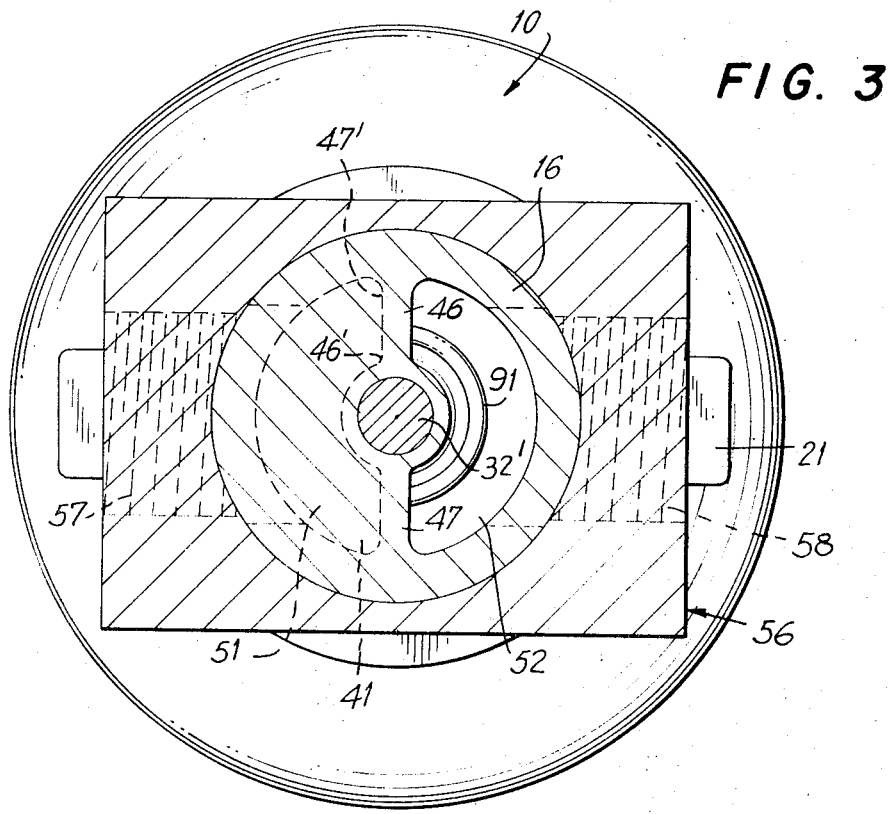
FIG. 3
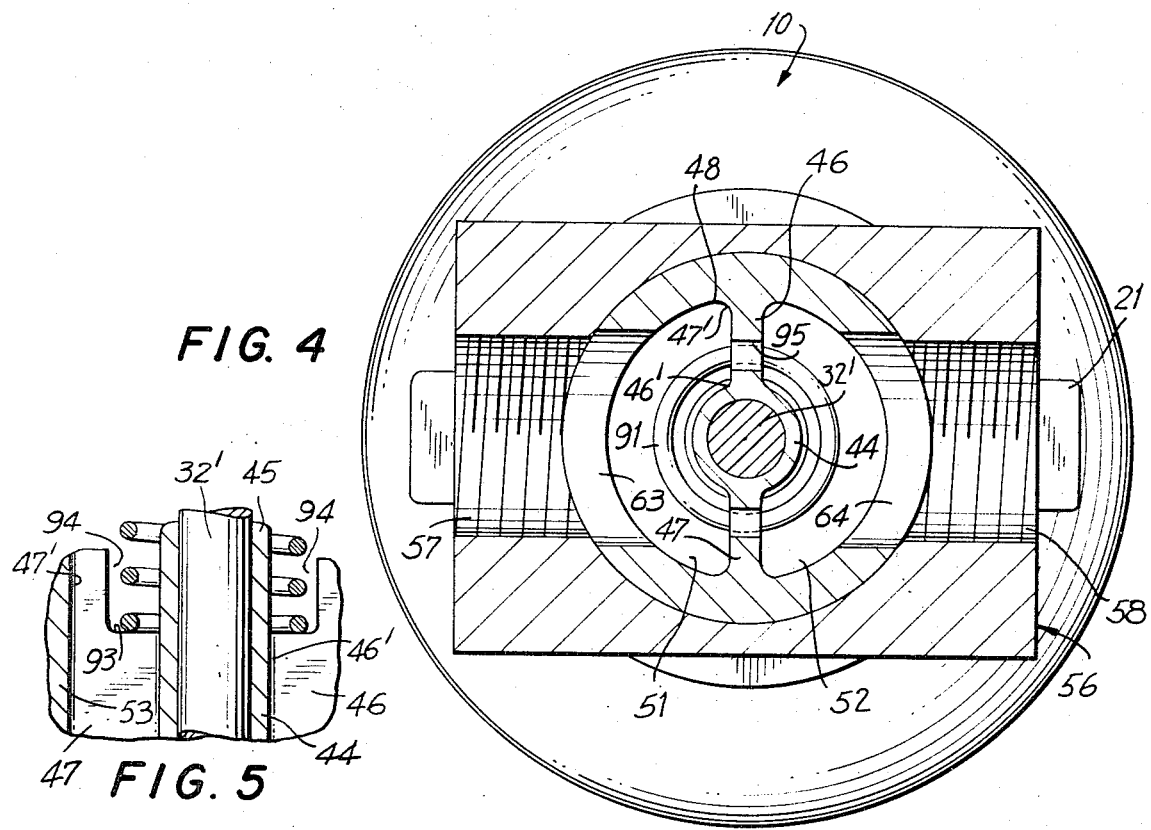
FIG. 4
FIG. 5

PRESSURE PULSE DAMPENER DEVICE

As conducive to an understanding of the invention, it is noted that where a hydraulic system utilizes a reciprocating type pump, more particularly of the piston type, due to the action of such pump, pulses are generated whose frequency is dependent upon the number of pistons in the pump and the speed thereof and whose amplitude is determined by the amount of oil displaced by each of the pistons.

Under many conditions of operation, the pulse frequency and/or the amplitude may be extremely high. As a result, if these high frequency large amplitude pulses are permitted to propagate through the entire hydraulic system without control, the repeated shocks imparted to the components of the system, such as piping, fittings, valves etc., could cause leakage and possible breakage of lines and damage to the system components.

In addition, unless controlled, due to the frequencies and amplitude of the pulses, harmonics could be created causing amplification of the amplitude of such pulses with resultant enhanced likelihood of damage to the system. Where, to minimize the amplitude of the pulses a pressure vessel is provided connected directly to the line through which the pulsating oil is flowing so that the pulses can be dampened by compressing the gas in the pressure vessel, unless a substantial portion of the pulsating oil is able to react against the gas in the pressure vessel, the dampening effect will be minimal.

It is accordingly among the objects of the invention to provide a pressure pulse dampener device which includes a pressure vessel having a movable partition therein defining a gas chamber and an oil chamber, the latter being in communication with the fluid line through which the pulsating oil will flow and which will insure that a major portion of the oil passing through such fluid line will react against the compressed gas in the pressure vessel to minimize the amplitude of the pulsations and which device will have a minimum pressure drop between the oil under pressure entering the device and the oil under pressure leaving the device, the device being relatively simple in construction having few parts that are not likely to be deranged even after long use.

According to the invention, these objects are accomplished by the arrangement and combination of elements hereinafter described and more particularly recited in the claims.

In the accompanying drawings in which is shown one of various possible embodiments of the several features of the invention;

FIG. 3 is a sectional view taken along line 3—3 of FIG. 2,

FIG. 4 is a sectional view taken along line 4—4 of FIG. 2, and

FIG. 5 is a sectional view taken alone line 5—5 of FIG. 2.

Figure 2:
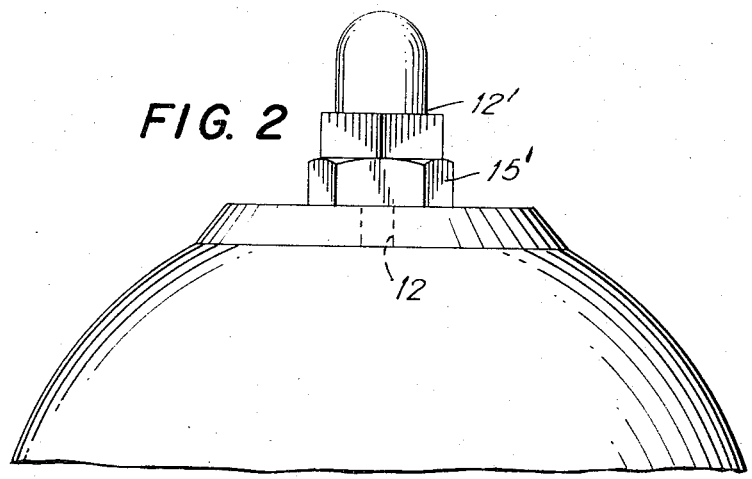
FIG. 2 is a longitudinal sectional view taken along line 2—2 of FIG. 1.

Referring now to the drawings, the pressure pulse dampener device desirably comprises a pressure resistant vessel illustratively a rigid shell 10 having opposed ports 11, 12 therein, one of said ports, illustratively port 12 being of smaller diameter than the other. Desirably, the smaller diameter port 12 is provided for the stem (not shown) of a standard pneumatic valve which is affixed to the shell by nuts 12' and 15', and the larger diameter port 11, which serves as the liquid port, is formed large enough to pass an accumulator bladder 13 therethrough.

The bladder 13 which is formed of resilient material such as rubber or synthetic plastic of like physical characteristics is capable of collapsing or expanding in use and in distended but substantially unstretched condition is smaller than the cavity of the shell 10. The bladder thus defines two chambers 14, 15 in the shell adapted to be charged with gas and oil respectively under pressure.

Positioned in the port 11 is an oil port assembly 20 which desirably comprises a tubular member 16 which has a flange 17 at its inner end defining an annular shoulder 17'. A locking member 18, illustratively a ring of greater outer diameter than said port 11 and deformable to permit its insertion thereinto, encompasses said tubular member 16 and is seated on the rim 19 of port 11.

Figure 1:
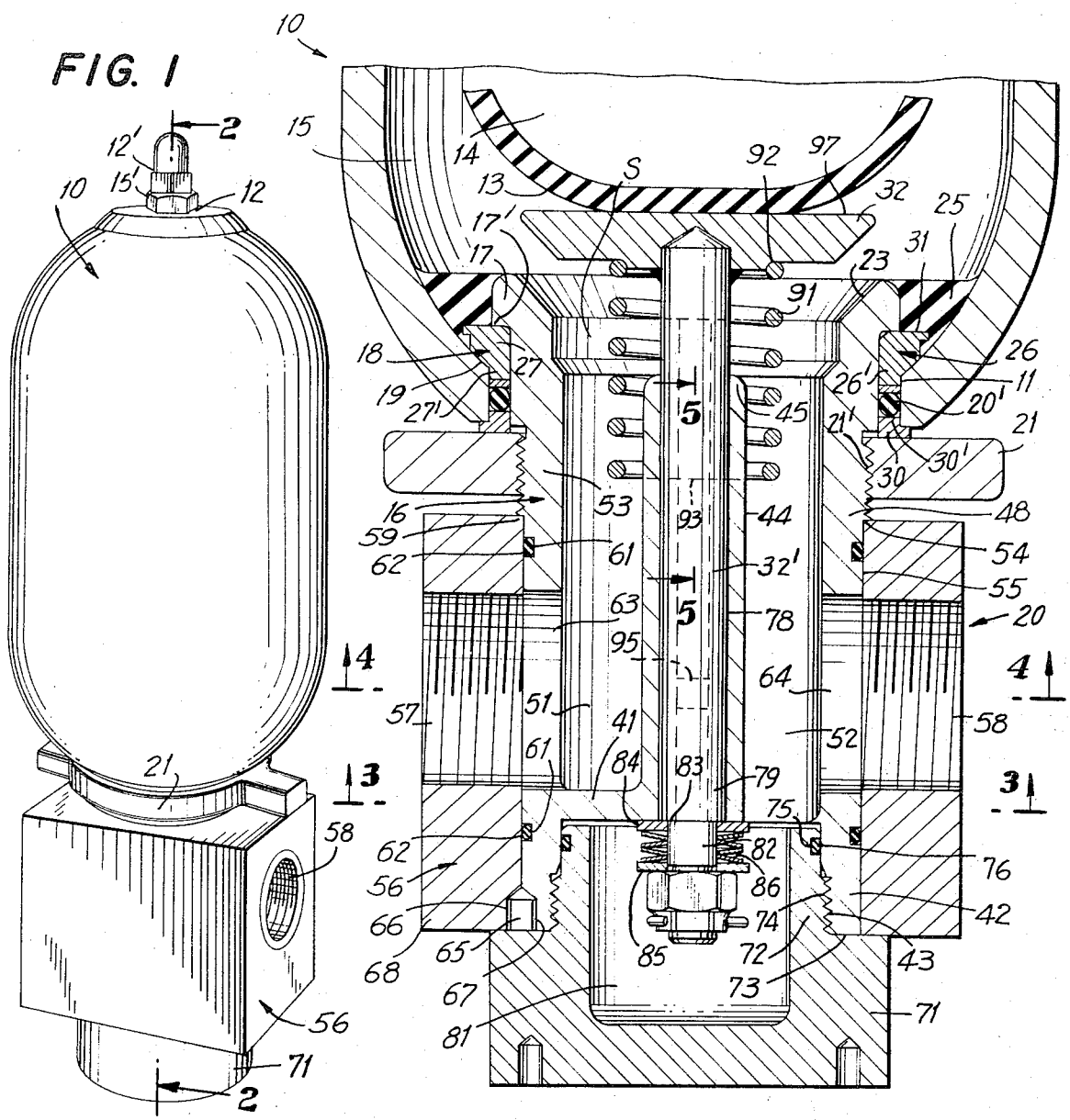
FIG. 1 is a perspective view of the device.

More particularly, as shown in the drawings, the locking member 18 comprises a pair of rigid arcuate segments 26, 27, preferably of steel and each having a flat top surface 31. The segments 26, 27 when juxtaposed, as shown in FIG. 1, define a ring of inner diameter less than the outer diameter of flange 17 so that the shoulder 17' of flange 17 may seat on the inner periphery of said segments and of outer diameter such that the substantially beveled side walls thereof may seat on the inner wall of shell 10 adjacent rim 19 of port 11.

Desirably each of the segments 26, 27 has an arcuate rib 26', 27' formed integral therewith on the undersurface thereof, which may be positioned between the outer surface of tubular member 16 and the wall of port 11 to substantially fill the space therebetween, thereby to prevent lateral displacement of the tubular member 16.

Encompassing said tubular member 16 and in juxtaposition with said port 11 is a rubber gasket 20' which serves effectively to prevent leakage between the wall of port 11 and the outer surface of tubular member 16. In addition, a sleeve or ring 30 encompasses tubular member 16 and has an integral rib 30' which also extends into the space between the outer surface of tubular member 16 and the wall of port 11. Thus, when a nut 21 is screwed on the externally threaded portion 21' of tubular member 16, it will move the latter outwardly securely to retain the tubular member in position and will compress gasket 20' between ribs 26', 27' and 30' to provide an effective seal.

With the construction of the locking member 18 thus far described, it is apparent that the adjacent ends (not shown) of the rigid segments 26, 27 define a space therebetween. In order to cover such space to prevent extrusion of the bladder 13 therethrough, a resilient ring 25 is provided preferably of natural or synthetic rubber or some other suitable plastic which may readily be deformed and is self-restoring to its original shape.

As shown, the inner diameter of ring 25 is greater than that of the ring defined by the juxtaposed arcuate segments 26, 27 and the outer diameter of the resilient ring is greater than that of the ring defined by the rigid arcuate segments. The outer periphery of the resilient ring is curved to conform to the curvature of the shell adjacent port 11.

The resilient ring is bonded to the flat top surface 31 of the rigid arcuate segments to form an integral assembly.

Desirably positioned in said tubular member 16 is a poppet valve comprising a valve head 32 adapted to seat on the beveled mouth 23 of tubular member 16 and having a stem 32' extending axially therefrom.

The construction thus far described, per se forms no part of the invention being shown in U.S. Pat. No. 3,439,712.

According to the invention, the tubular member 16 of the oil port assembly 20, has a semi-circular wall 41 positioned inwardly of its outer end 42 and extending transversely thereacross, said outer end 42 being internally threaded as at 43.

Extending inwardly from transverse wall 41, axially of the tubular member 16 is a tubular sleeve or guide member 44, the inner end 45 of which is positioned outwardly of the valve seat defined by the beveled mouth 23 of the tubular member 16. The sleeve 44 has transversely extending walls 46, 47 which are diametrically aligned and having their inner and outer edges 46', 47' integrally formed with the sleeve 44 and the wall 48 of tubular member 16, said walls 46, 47 extending from the plane of transverse wall 41 to the plane of the inner end 45 of sleeve 44 to define longitudinal chambers or passageways 51, 52.

The outer portion 53 of tubular member 16 which is of reduced outer diameter defining an annular shoulder 54, is positioned in the bore 55 of a rectangular block 56 in which the pressure inlet and outlet ports 57, 58 of the pressure accumulator are formed. One end 59 of block 56 abuts against shoulder 54.

The outer surface of the reduced diameter wall portion 53 of tubular member 16 is provided with a pair of longitudinally spaced annular grooves 61 in each of which an O ring 62 is positioned to form a seal between the bore 55 of block 56 and the reduced diameter portion 53.

As is shown in FIGS. 1 and 2, the ports 57, 58 are aligned with corresponding openings 63, 64 in the wall 48 of tubular member 16 such alignment being established and maintained by a pin 65 positioned in semicircular recesses 66, 67 in the outer end 68 of block 56 and the outer end 42 of tubular member 16, said outer ends 42, 68 being aligned as shown.

Means are provided releasably to retain the block 56 in assembled position on tubular member 16. To this end, a cup-shaped cylindrical plug 71 is provided of reduced diameter at one end as at 72, defining an annular shoulder 73. The reduced diameter portion 72 is externally threaded as at 74 so that the plug 71 may be screwed into the end 42 of the tubular member 16. As a result, the annular shoulder 73 of plug 71 will abut against the end 68 of block 56 retaining the end 59 thereof against shoulder 54. An annular groove 75 is provided in the portion 72 of plug 71, to receive an O ring 76 that forms a seal.

As shown in FIG. 1, for example, the stem 32' extends through the bore 78 of sleeve 44 with a sliding fit, the free end 79 of stem 32' extending into the cavity 81 of plug 71 and having a reduced diameter portion 82 defining an annular shoulder 83, said reduced diameter portion 82 being externally threaded at its end.

Encompassing the reduced diameter portion 82 are washers 84, 85 of larger outer diameter than stem 32'. The washer 84 is normally retained against shoulder 83 by a coil spring 86 encompassing the stem portion 82 between washers 84, 85 and a nut 87 screwed on the threaded end of the stem 32' retains washer 85 against the adjacent end of the coil spring 86.

The valve head 32 is normally urged inwardly to open position spaced from seat 23 by a coil spring 91 encompassing stem 32' near its root end and compressed between the undersurface 92 of the valve head 32 and the floor 93 of a longitudinal notch 94 formed in the inner ends of each of the walls 46, 47.

As shown in FIGS. 1 to 3 each of the walls 46, 47 has an opening 95 therethrough aligned with the ports 57, 58 and openings 63, 64, the function of said openings 95 being hereinafter set forth.

OPERATION

In operation of the pressure pulse dampener device, above described, the bladder 13 is first precharged with gas under pressure through the valve in port 12 and the valve is then closed. The charged expanded bladder will press against the valve member 32 moving it against its seat 23 against the force exerted by the compressed coil spring 91. As the inner surface 97 of the valve member 32 and the inner surface of the resilient ring 25 are substantially in the same plane, a smooth substantially uninterrupted surface will be presented against which the end of the bladder may abut without likelihood of pinching and injury thereto.

The port 57 of the pulse dampener device is connected to a pump which supplies oil under pressure from a suitable reservoir for example. The port 58 is connected to the hydraulic system to be supplied with oil under pressure.

As the pump operates, oil under pressure greater than that in the precharged bladder will flow into port 57, through opening 63 into chamber 51, then through such chamber, and across the space S between the inner ends of walls 46, 47 and the undersurface 92 of the valve member, then through chamber 52 out of port 58 into the hydraulic system. The oil will also flow into cavity 81 filling the latter.

In addition, due to the fact that the pressure of the oil in normal operation plus the force of spring 91 urging the valve member to open position is greater than the pressure in bladder 13, the valve member 32 will be moved off its seat and the chamber 15 of the pressure vessel will charge with oil under pressure compressing the bladder and the gas contained therein.

Although the inward movement of the valve member and valve stem 32' will occur rapidly causing the washer 84 to abut against the outer surface of wall 41, the force will be absorbed both by the dashpot action caused by the large diameter washers 84, 85 moving through the oil in cavity 81, and the movement of washer 85 against the coil spring 86.

As the pump operates it delivers oil under pressure at a pulse frequency dependent upon the type of pump employed. More particularly the pumps are generally of the reciprocating piston type and the pulse frequency is dependent upon the number of pistons in the pump and the speed thereof. In addition, the amplitude of the pulses may be considerable, being dependent upon the oil displaced by each piston.

Unless controlled, these high frequency large amplitude pulses would propagate through the entire system and the repeated shocks imparted to the components of the system such as pipes, fittings, valves, etc. could cause leakage and possible breakage of lines and damage to the system components.

In addition, unless controlled, due to the frequency and amplitude of the pulses, harmonics could be created causing amplification of the amplitude of such pulses with resultant enhanced likelihood of damage to the system.

By reason of the unique design of the pressure pulse dampener device herein described, such problems are greatly alleviated.

More particularly it is to be noted that substantially all of the pulsating oil under pressure which flows into the inlet port 57, does not flow directly out of outlet port 58 but is guided in a tortuous path. Thus, the majority of the oil that flows into port 57 has its direction changed at right angles as it strikes the walls 46, 47 of chamber 51 so that it will flow through said chamber 51 into the chamber 15 of the pressure vessel to react against the bladder and then the oil will flow out of said chamber 15 into passageway or chamber 52. In addition, the oil will also flow transversely across the space S and turn at right angles to flow through chamber 52. The oil flowing through chamber 52 will flow into cavity 81 and then reverse its flow and will also flow out of port 58.

It is apparent that except for the relatively small quantity of oil that flows directly from port 57, through opening 63, ports 95, opening 64 and port 58, substantially all of the oil will flow in the tortuous path above described from port 57 to port 58 and hence the pulsations in such oil will react against the inflated bladder 13 causing reduction in the amplitude of the pulses by converting the pulse energy into potential energy in the form of the compressed gas in the bladder.

It is to be noted that although the amplitude of the pressure pulses is greatly reduced by the arrangement above described, the turbulence created by the sharp changes of direction of oil flow, causes a pressure drop between the input port and output port. Under some conditions such pressure drop may be below the value desired with a given input pressure into port 57.

The turbulence is most pronounced adjacent the outlet port 58 due to the fact that not only does the oil change its direction 90° as it flows through chamber 52 and out of port 58, but the oil also flows into cavity 81 and reverses its direction to flow back into chamber 52 and out of port 58.

The problem of pressure drop is alleviated by the opening 95 in walls 46, 47.

Thus as previously noted, such openings provide a direct path for flow of the oil under pressure from port 57 to port 58 which reduces the pressure drop that would otherwise be present in the absence of such openings.

More particularly, this is due to the fact that the direct flow of a portion of the oil through the openings 95 tends to reduce the turbulence existing in chamber 52 adjacent the outlet port 58 by imparting a laminar flow directly out of port 58.

Thus, the diameter of openings 95 is less than that of port 57 so that the velocity of the oil flowing through port 95 into chamber 52 will be increased and the high speed jets of oil passing through the oil adjacent port 58 will tend to smooth out such turbulence due to the laminar flow that is created which reduces the turbulence and hence reduces the pressure drop adjacent the outlet port 58.

Since the amplitude of the pulses in the oil flowing in chamber 52 through outlet port 58 has already been reduced by the energy absorbing action of bladder 13 in pressure vessel 10, the resultant output flow of oil will have the pulses dampened to an acceptable level and the pressure drop will also be at an acceptable level.

By selection of the optimum size for openings 95 based on the physical parameter of the oil port assembly and the pump capacity and required output pressure, the system will provide the desired output pressure with the pulse amplitude dampened to an acceptable value.

Having thus described my invention, what I claim as new and desire to secure by Letters Patent of the United States is:

1. A pressure pulse dampener comprising a pressure vessel having a movable partition therein defining two chambers each having a port in communication therewith, one of said ports defining a gas port for charging of one of said chambers with gas under pressure and the other an oil port, an oil port assembly comprising a hollow sleeve axially aligned with said oil port and rigidly secured at one end thereto and in communication therewith, said sleeve having a partition therein extending diametrically thereacross defining two chambers extending longitudinally of said sleeve, each having one end spaced outwardly from said oil port, said sleeve having two spaced, diametrically aligned openings therethrough extending transversely into said sleeve and in communication respectively with said longitudinal chambers, said sleeve partition having fluid passage means therethrough transversely aligned with said two openings, whereby a tortuous path is provided for oil under pressure from one of said openings to the other of said openings, said oil port being in communication with said tortuous path, said fluid passage means providing a direct path from one of said openings to the other of said openings for a portion of the oil entering said first opening.

2. The combination set forth in claim 1 in which the cross sectional area of said fluid passage means is less than that of the first opening.

3. The combination set forth in claim 1 in which a valve seat is provided in said oil port coaxial with said sleeve, a valve member is associated with said seat, resilient means reacting against said valve member normally urging it away from said seat, the ports of said pressure vessel being axially aligned, said movable partition comprising a deformable bladder having a mouth at one end in communication with said gas port and being closed at its other end, said closed end being adapted to move against said valve member to urge the latter against said seat.

4. The combination set forth in claim 3 in which said valve member has a stem affixed at one end thereto and extending axially through said sleeve, means in said sleeve slidably to guide said stem, means to limit the movement of said valve member away from said valve seat.

5. The combination set forth in claim 3 in which the partition in said sleeve has a longitudinal bore therethrough axially aligned with said sleeve, said valve member has a stem affixed at one end thereto and extending through the bore of said partition for slidable movement of said stem and means to limit the movement of said valve member away from said valve seat.

6. The combination set forth in claim 1 in which said oil port assembly comprises a block having a longitudinal bore therethrough, said sleeve extending through said bore, said block having a pair of opposed transversely aligned bores leading into said longitudinal bore and aligned respectively with the openings in said sleeve, said bores defining an inlet port and an outlet port respectively, means releasably to retain said block in fixed position on said sleeve.

7. The combination set forth in claim 6 in which said sleeve has a reduced outer diameter portion defining an annular shoulder, the bore of said block encompasses said reduced diameter portion, one end of said block abutting against said annular shoulder, said sleeve being internally threaded at its outer end, a cap having a reduced diameter portion defining an annular shoulder, said reduced diameter portion being externally threaded to engage the internal threads of said, whereby when said cap is screwed into locking position the annular shoulder thereof will abut against the block to retain the latter against the annular shoulder of said sleeve.

8. The combination set forth in claim 1 in which the inner end of said sleeve in said oil port defines a valve seat, a valve member associated with said seat, resilient means reacting against said valve member normally urging it away from said seat, the ports of said pressure vessel being axially aligned, said movable partition comprising a deformable bladder having a mouth at one end in communication with said gas port and being closed at its other end, said closed end being adapted to move against said valve member to urge the latter against said seat, the inner end of said sleeve partition being spaced from the transverse plane of said valve seat to provide constant communication between said longitudinal chambers, said partition having at least one opening therethrough transversely aligned with said sleeve openings to define said passageway means.

9. The combination set forth in claim 3 in which the partition in said sleeve has a longitudinal bore therethrough axially aligned with said sleeve, said valve member has a stem affixed at one end thereto and extending through the bore of said partition for slidable movement of said stem, a block having a longitudinal bore therethrough, said sleeve extending through said longitudinal bore, means releasably to retain said block in fixed position on said sleeve, said block having a pair of opposed transversely aligned bores leading into said longitudinal bore and aligned respectively with the openings in said sleeve, said bores defining an inlet port and an outlet port respectively.

10. The combination set forth in claim 3 in which the partition in said sleeve has a longitudinal bore therethrough axially aligned with said sleeve, said valve member has a stem affixed at one end thereto and extending through the bore of said partition for slidable movement of said stem, a block having a longitudinal bore therethrough, said sleeve extending through said longitudinal bore, a cup-shaped cap coacting with the outer end of said sleeve and the adjacent portion of said block releasably to retain said block in fixed position on said sleeve, the outer end of said valve stem being positioned in the cavity of said cap, means mounted on the outer end of the valve stem to limit the movement of the valve member away from its seat, said block having a pair of opposed transversely aligned bores leading into said longitudinal bore and aligned respectively with the openings in said sleeve, said bores defining an inlet port and outlet port respectively, the end of the longitudinal chamber in communication with the inlet port and adjacent said cap being closed, and the end of the longitudinal chamber in communication with the outlet port and adjacent said cap being open and in communication with the cavity in said cap.

11. The combination set forth in claim 10 in which means are provided in said cavity resiliently to limit the movement of said valve member away from said valve seat.

12. A pressure pulse dampener comprising a pressure vessel having a movable partition therein defining two chambers each having a port in communication therewith, one of said ports defining a gas port for charging of one of said chambers with gas under pressure and the other an oil port, an oil port assembly comprising a hollow sleeve having an opening axially aligned with said oil port, said sleeve being rigidly secured to said oil port and in communication therewith, said sleeve having a partition therein extending diametrically thereacross defining two chambers, said partition extending longitudinally of said oil port and being substantially axially aligned therewith, each chamber having one end spaced outwardly from said oil port, said sleeve having two spaced openings extending into said sleeve and in communication respectively with said chambers, said sleeve partition having fluid passage means therethrough aligned with said two openings, whereby a first tortuous path is provided for oil under pressure from one of said openings to the other of said openings, said oil port being in communication with said tortuous path, and a second direct path is provided by said fluid passage means from one of said openings to the other of said openings for a portion of the oil under pressure entering said first spaced opening.

* * * * *